United States Patent
Bhagwagar et al.

(10) Patent No.: US 8,618,211 B2
(45) Date of Patent: Dec. 31, 2013

(54) THERMALLY CONDUCTIVE GREASE AND METHODS AND DEVICES IN WHICH SAID GREASE IS USED

(75) Inventors: Dorab Edul Bhagwagar, Saginaw, MI (US); David Ha, Midland, MI (US); Sarah Nicol, Vernon, CT (US); Kai Su, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 172 days.

(21) Appl. No.: 13/144,700

(22) PCT Filed: Jan. 22, 2010

(86) PCT No.: PCT/US2010/021726
§ 371 (c)(1), (2), (4) Date: Jul. 15, 2011

(87) PCT Pub. No.: WO2010/107516
PCT Pub. Date: Sep. 23, 2010

(65) Prior Publication Data
US 2011/0272119 A1  Nov. 10, 2011

Related U.S. Application Data

(60) Provisional application No. 61/160,398, filed on Mar. 16, 2009.

(51) Int. Cl.
C08L 83/04 (2006.01)

(52) U.S. Cl.
USPC ........... 524/588; 524/430; 524/432; 524/437; 524/441; 525/477; 528/43

(58) Field of Classification Search
None
See application file for complete search history.

(56) References Cited

U.S. PATENT DOCUMENTS

| | | | |
|---|---|---|---|
| 4,842,753 A * | 6/1989 | Mori et al. ................ 508/206 |
| 5,011,870 A | 4/1991 | Peterson |
| 5,100,568 A | 3/1992 | Takahashi et al. |
| 5,221,339 A | 6/1993 | Takahashi et al. |
| 5,227,081 A | 7/1993 | Sawa et al. |
| 5,981,641 A | 11/1999 | Takahashi et al. |
| 6,114,413 A | 9/2000 | Kang et al. |
| 6,136,758 A | 10/2000 | Yamada et al. |
| 6,169,142 B1 | 1/2001 | Nakano et al. |
| 6,174,841 B1 | 1/2001 | Yamada et al. |
| 6,255,257 B1 | 7/2001 | Yamada et al. |
| 6,689,721 B2 | 2/2004 | Denpo et al. |
| 7,329,706 B2 | 2/2008 | Fukui et al. |
| 7,648,767 B2 | 1/2010 | Fu et al. |
| 7,695,817 B2 | 4/2010 | Lin et al. |
| 2002/0018885 A1 | 2/2002 | Takahashi et al. |
| 2002/0039662 A1 | 4/2002 | Ducros et al. |
| 2002/0124910 A1 | 9/2002 | Miyazaki et al. |
| 2003/0000690 A1 | 1/2003 | Chiu et al. |
| 2003/0168731 A1 | 9/2003 | Matayabas et al. |
| 2003/0195124 A1 | 10/2003 | Yamada et al. |
| 2003/0203188 A1 | 10/2003 | Bunyan |
| 2004/0092654 A1 | 5/2004 | Jennrich et al. |
| 2004/0097628 A1 | 5/2004 | Sekiba |
| 2005/0110133 A1 | 5/2005 | Yamada et al. |
| 2005/0261140 A1 | 11/2005 | Yamada et al. |
| 2006/0112857 A1 | 6/2006 | Hougham et al. |
| 2006/0135687 A1 | 6/2006 | Fukui |
| 2006/0292840 A1 | 12/2006 | Lin et al. |
| 2007/0149834 A1 | 6/2007 | Endo et al. |
| 2007/0161517 A1 | 7/2007 | Cheng et al. |
| 2007/0179232 A1 | 8/2007 | Collins et al. |
| 2007/0185259 A1 | 8/2007 | Hoshino |
| 2007/0196589 A1 | 8/2007 | Fu et al. |
| 2007/0235683 A1 | 10/2007 | Cheng et al. |
| 2007/0246690 A1 | 10/2007 | Kuo et al. |
| 2007/0249755 A1 | 10/2007 | Hiroshige et al. |
| 2007/0293624 A1 * | 12/2007 | Matsumoto et al. .......... 524/588 |
| 2008/0004191 A1 | 1/2008 | Ishigaki |
| 2008/0023665 A1 | 1/2008 | Weiser et al. |
| 2008/0063879 A1 | 3/2008 | Lin et al. |
| 2008/0085966 A1 | 4/2008 | Fukui et al. |
| 2008/0220998 A1 | 9/2008 | Feger et al. |
| 2009/0004389 A1 | 1/2009 | Chung et al. |
| 2010/0105582 A1 | 4/2010 | Joffre et al. |

FOREIGN PATENT DOCUMENTS

| | | |
|---|---|---|
| EP | 0939115 A1 | 9/1999 |
| WO | 0121393 A1 | 3/2001 |
| WO | 0143146 A1 | 6/2001 |
| WO | 02092693 A1 | 11/2002 |
| WO | 2004041938 A1 | 5/2004 |
| WO | 2005047378 A2 | 5/2005 |
| WO | 2007106209 A2 | 9/2007 |

OTHER PUBLICATIONS

Nobuhiro, Imaizumi, et. al., JP 2001-002830. Abstract only.
Eiji, Tokuhira, et. al., JP 2002-030217. Abstract only.
Takayuki, Takahashi, et. al., JP 02-153995. Abstract only.
Hiroaki, Sawa, et. al., JP 2004-010880. Abstract only.
Akihiro, Endo, et. al., JP 2004-210856. Abstract only.
Masato, Kawano, et. al., JP 2005-054099. Abstract only.
Toyohito, Uematsu, et. al., JP 05-156275. Abstract only.
Toshitaka, Yamagata, et. al., JP 2005-170971. Abstract only.
Hiroki, Sano, et. al., JP 2007-291294. Abstract only.
Kazumasa, Igarashi, et. al., JP 59-179650. Abstract only.
Masanori, Toya, JP 62-043492. Abstract only.
Masanori, Toya, JP 62-043493. Abstract only.

* cited by examiner

Primary Examiner — Marc Zimmer
(74) Attorney, Agent, or Firm — Claude F. Purchase

(57) ABSTRACT

A thermally conductive grease includes 2 vol % to 15 vol % of a combination of three polyorganosiloxanes and 65 vol % to 98 vol % of a thermally conductive filler. The grease may be used as a thermal interface material for dissipating heat from (opto)electronic devices, in both TIM1 and TIM2 applications.

16 Claims, 1 Drawing Sheet

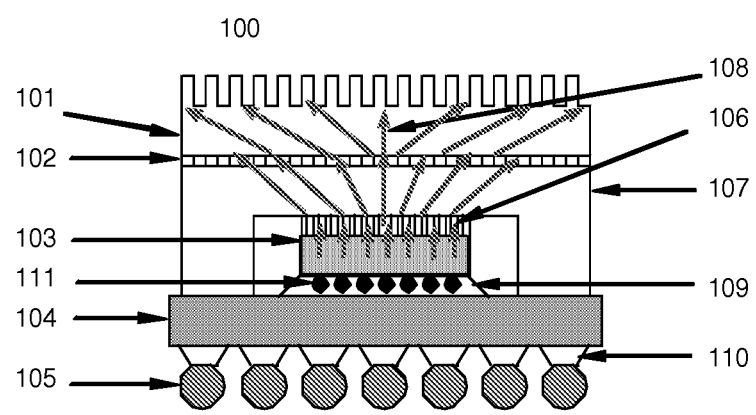

THERMALLY CONDUCTIVE GREASE AND METHODS AND DEVICES IN WHICH SAID GREASE IS USED

CROSS REFERENCE TO RELATED APPLICATIONS

This application is a U.S. national stage filing under 35 U.S.C. §371 of PCT Application No. PCT/US 10/021726 filed on 22 Jan. 2010, currently pending, which claims the benefit of U.S. Provisional Patent Application No. 61/160,398 filed 16 Mar. 2009 under 35 U.S.C. §119 (e). PCT Application No. PCT/US10/021,726 and U.S. Provisional Patent Application No. 61/160,398 are hereby incorporated by reference.

STATEMENT REGARDING FEDERALLY FUNDED RESEARCH

None.

FIELD OF THE INVENTION

A thermally conductive grease ("grease"), methods for preparation and use of the grease, and devices containing the grease are disclosed. More particularly, this invention relates to a grease including a combination of polyorganosiloxanes having a thermally conductive filler dispersed therein. The grease may be used as a thermal interface material ("TIM"). The grease is useful in both TIM1 applications (where the grease is in direct contact with a heat generating component) and TIM2 applications (where the grease contacts a surface of a heat dissipator, but does is not in direct contact with the heat generating component).

BACKGROUND (Opto)electronic components such as semiconductors, transistors, integrated circuits (ICs), discrete devices, light emitting diodes (LEDs) and others known in the art are designed to operate at a normal operating temperature or within a normal operating temperature range. However, the operation of an (opto)electronic component generates heat. If sufficient heat is not removed, the (opto)electronic component will operate at a temperature significantly above its normal operating temperature. Excessive temperatures can adversely affect performance of the (opto)electronic component and operation of the device associated therewith and negatively impact mean time between failures.

To avoid these problems, heat can be removed by thermal conduction from the (opto)electronic component to a heat sink. The heat sink can then be cooled by any convenient means such as convection or radiation techniques. During thermal conduction, heat can be transferred from the (opto)electronic component to the heat sink by surface contact between the (opto)electronic component and the heat sink or by contact of the (opto)electronic component and heat sink with a TIM. The lower the thermal impedance of the medium, the greater the flow of heat from the (opto)electronic component to the heat sink.

Surfaces of the (opto)electronic component and the heat sink are typically not completely smooth, therefore, it is difficult to achieve full contact between the surfaces. Air spaces, which are poor thermal conductors, appear between the surfaces and increase impedance. These spaces can be filled by inserting a TIM between the surfaces. Therefore, there is a continuing need for TIMs with good thermal properties (high conductivity and low impedance) and heat stability (the grease resists viscosity increase with time) as devices become smaller and generate more heat.

SUMMARY OF THE INVENTION

A grease comprises a combination of polyorganosiloxanes and a thermally conductive filler. The grease is useful as a TIM.

DETAILED DESCRIPTION OF THE PREFERRED EMBODIMENTS OF THE INVENTION

All amounts, ratios, and percentages are by weight unless otherwise indicated. The following is a list of definitions, as used herein.

Definitions and Usage of Terms

The articles "a", "an", and "the" each refer to one or more. "Combination" means two or more items put together by any method.

The abbreviation "cSt" means centiStokes.

"Surface treated" means that all, or a portion of, reactive groups on a particle have been rendered unreactive by any convenient chemical or unreactive means.

The abbreviation "W/mK" means Watts per meter Kelvin.

Grease

A grease comprises:
(A) a combination of polyorganosiloxanes comprising
a polyorganosiloxane of formula (I) $R^1R^2{}_2Si\text{—}(OSiR^2{}_2)_a\text{—}R^3\text{—}Si(OR^4)_3$
where each $R^1$ is independently selected from an alkyl group or an alkenyl group, each $R^2$ is an alkyl group, each $R^3$ is selected from an oxygen atom or a divalent hydrocarbon group, each $R^4$ is an alkyl group of 1 to 6 carbon atoms, and subscript a has an average value ranging from 5 to 200;
an aryl polyorganosiloxane of formula (II) $R^5{}_3Si\text{—}(OSiR^5R^6)_b(OSiR^5{}_2)_c\text{—}R^7\text{—}SiR^5{}_3$
where each $R^5$ is an alkyl group, each $R^6$ is an aryl group, each $R^7$ is selected from an oxygen atom or a divalent hydrocarbon group, subscript b has an average value of at least 1, and subscript c an average value of at least 1; with the provisos that subscript b and subscript c have average values such that a sum of (b+c) is sufficient to provide the second polyorganosiloxane of formula (II) with a viscosity ranging from 5 to 30,000 cSt, and the second polyorganosiloxane of formula (II) is compatible with the first polyorganosiloxane of formula (I); and
(B) a thermally conductive filler.

(A) Polyorganosiloxanes

Ingredient (A) comprises a polyorganosiloxane of formula (I): (I) $R^1R^2{}_2Si\text{—}(OSiR^2{}_2)_a\text{—}R^3\text{—}Si(OR^4)_3$. In formula (I), each $R^1$ is an alkyl group, such as methyl, ethyl, propyl, butyl, pentyl, hexyl, octyl, or decyl; or an alkenyl group such as vinyl, allyl, butenyl, or hexenyl. Alternatively, each $R^1$ may be a methyl group or a vinyl group. Alternatively, each $R^1$ may be a methyl group. Each $R^2$ is an alkyl group, such as methyl, ethyl, propyl, butyl, pentyl, hexyl, octyl, or decyl. Alternatively, each $R^2$ is a methyl group. Each $R^3$ is selected from an oxygen atom or a divalent hydrocarbon group. Whether $R^3$ is an oxygen atom or a divalent hydrocarbon group depends on the method used to prepare the polyorganosiloxane of formula (I). Alternatively, each $R^3$ is an oxygen atom. Each $R^4$ is an alkyl group of 1 to 6 carbon atoms, alternatively 1 to 4 carbon atoms. Alternatively, each $R^4$ may be a methyl group. Subscript a has an average value ranging from 5 to 200, alternatively 10 to 180, alternatively 15 to 150, and alternatively 15 to 120. The amount of the polyorganosiloxane of formula (I) depends on various factors including the type and amounts of thermally conductive filler selected for ingredient (B), however, the amount of the polyorganosiloxane of formula (I) may range from 1% to 10%, alternatively 2% to 10%, based on the combined weights of all ingredients in the grease. The polyorganosiloxane of formula (I) may be a single polyorganosiloxane. Alternatively, the polyorganosiloxane of formula (I) may be a combination comprising two or more polyorganosiloxanes that differ in at least one of the following properties: degree of polymerization, terminal groups, viscosity, and sequence.

The combination of polyorganosiloxanes of formula (I) may comprise, for example:

a first polyorganosiloxane of formula (Ia) $R^8R^9{}_2Si$—$(OSiR^9{}_2)_d$—$R^{10}$—$Si(OR^{11})_3$ where each $R^8$ is an alkyl group or an alkenyl group, each $R^9$ is an alkyl group, each $R^{10}$ is selected from an oxygen atom or a divalent hydrocarbon group, each $R^{11}$ is an alkyl group of 1 to 6 carbon atoms, and subscript d has an average value ranging from 75 to 200; and a second polyorganosiloxane of formula

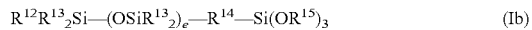

$R^{12}R^{13}{}_2Si$—$(OSiR^{13}{}_2)_e$—$R^{14}$—$Si(OR^{15})_3$ (Ib)

where each $R^{12}$ is an alkenyl group, each $R^{13}$ is an alkyl group, each $R^{14}$ is selected from an oxygen atom or a divalent hydrocarbon group, each $R^{15}$ is an alkyl group of 1 to 6 carbon atoms, and subscript e has an average value ranging from 5 to 50.

The first polyorganosiloxane in the combination may have formula (Ia): (Ia) $R^8R^9{}_2Si$—$(OSiR^9{}_2)_d$—$R^{10}$—$Si(OR^{11})_3$. In formula (Ia), each $R^8$ is an alkyl group, such as methyl, ethyl, propyl, butyl, pentyl, hexyl, octyl, or decyl; or an alkenyl group such as vinyl, allyl, butenyl, or hexenyl. Alternatively, each $R^8$ may be a methyl group or a vinyl group. Alternatively, each $R^8$ may be a methyl group. Each $R^9$ is an alkyl group, such as methyl, ethyl, propyl, butyl, pentyl, hexyl, octyl, or decyl. Alternatively, each $R^9$ may be a methyl group. Each $R^{10}$ is selected from an oxygen atom or a divalent hydrocarbon group. Whether $R^{10}$ is an oxygen atom or a divalent hydrocarbon group depends on the method used to prepare the polyorganosiloxane of formula (Ia). Alternatively, each $R^{10}$ is an oxygen atom. Each $R^{11}$ is an alkyl group of 1 to 6 carbon atoms, alternatively 1 to 4 carbon atoms. Alternatively, each $R^{11}$ may be a methyl group. In the polyorganosiloxane of formula (Ia), subscript d may have an average value ranging from 75 to 200, alternatively 100 to 150.

Suitable polyorganosiloxanes of formula (Ia) may comprise, for example: $(CH_3)_3SiO$—$\{(CH_3)_2SiO_{110}\}$—$O$—$Si(OCH_3)_3$, $(CH_3)_3SiO$—$\{(CH_3)_2SiO_{110}\}$—$CH_2CH_2$—$Si(OCH_3)_3$,

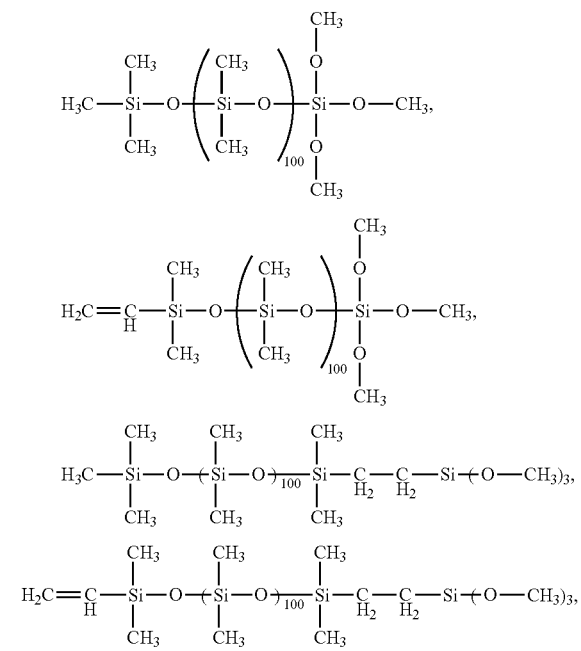

or a combination thereof. When the combination of polyorganosiloxanes of formula (Ia) and formula (Ib) is used, the amount of polyorganosiloxane of formula (Ia) depends on various factors including the type and amount of thermally conductive filler selected for ingredient (B) and the type and amount of polyorganosiloxane selected for ingredient (Ib), however, the amount may range from 1% to 5% of combined weights of all ingredients in the grease.

The combination further comprises the second polyorganosiloxane, which has formula (Ib). Formula (Ib) is $R^{12}R^{13}{}_2Si$—$(OSiR^{13}{}_2)_e$—$R^{14}$—$Si(OR^{15})_3$. In formula (Ib), each $R^{12}$ is an alkyl group, such as methyl, ethyl, propyl, butyl, pentyl, hexyl, octyl, or decyl; or an alkenyl group such as vinyl, allyl, butenyl, or hexenyl. Alternatively, each $R^{12}$ may be a methyl group or a vinyl group. Alternatively, each $R^{12}$ may be a vinyl group. Each $R^{13}$ is an alkyl group, such as methyl, ethyl, propyl, butyl, pentyl, hexyl, octyl, or decyl. Alternatively, each $R^{13}$ may be a methyl group. Each $R^{14}$ is selected from an oxygen atom or a divalent hydrocarbon group. Whether $R^{14}$ is an oxygen atom or a divalent hydrocarbon group depends on the method used to prepare the fourth polyorganosiloxane of formula (Ib). Alternatively, each $R^{14}$ is an oxygen atom. Each $R^{15}$ is an alkyl group of 1 to 6 carbon atoms, alternatively 1 to 4 carbon atoms. Alternatively, each $R^{15}$ may be a methyl group. Subscript e has an average value ranging from 5 to 50, alternatively 7 to 40, alternatively 9 to 30, and alternatively 11 to 25. The amount of the polyorganosiloxane of formula (Ib) depends on various factors including the type and amount of thermally conductive filler selected for ingredient (B) and the type and amount of the polyorganosiloxane of formula (Ia), however, in grease containing the combination of polyorganosiloxanes of formulae (Ia) and (Ib), the amount of the polyorganosiloxane of formula (Ib) may range from 1% to 5% based on the combined weights of all ingredients in the grease.

Suitable polyorganosiloxanes of formula (Ib) may comprise, for example:

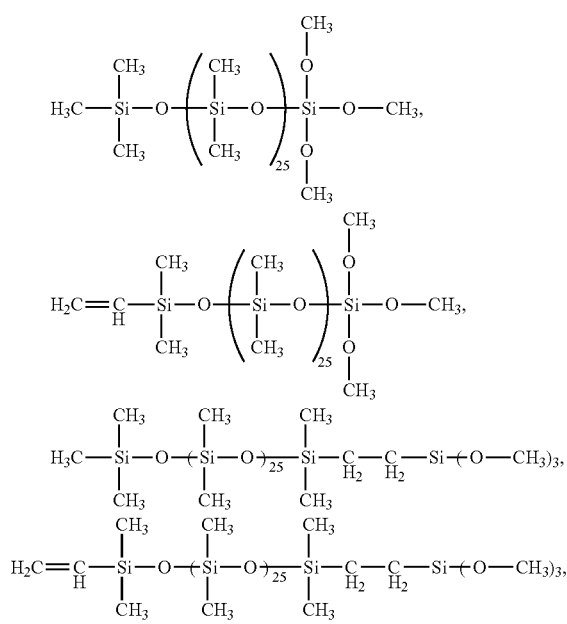

$(CH_3)_3SiO\text{—}\{(CH_3)_2SiO\}_{29}\text{—}O\text{—}Si(OCH_3)_3$,
$(CH_3)_3SiO\text{—}\{(CH_3)_2SiO\}_{29}\text{—}CH_2CH_2\text{—}Si(OCH_3)_3$,
$H_2C\text{=}CH_2(CH_3)_2SiO\text{—}\{(CH_3)_2SiO\}_{29}\text{—}O\text{—}Si(OCH_3)_3$,
$H_2C\text{=}CH_2(CH_3)_2SiO\text{—}\{(CH_3)_2SiO\}_{29}\text{—}CH_2CH_2\text{—}Si$
  $(OCH_3)_3$, or a combination thereof.

Ingredient (A) further comprises a second polyorganosiloxane of formula (II): (II) $R^5_3Si\text{—}(OSiR^5R^6)_b(OSiR^5_2)_c\text{—}R^7\text{—}SiR^5_3$. In formula (II), each $R^5$ is independently an alkyl group such as methyl, ethyl, propyl, butyl, pentyl, hexyl, octyl, or decyl. Alternatively, each $R^5$ may be a methyl group. Each $R^6$ is an aryl group, such as phenyl, tolyl, xylyl, naphthyl, benzyl, or phenylethyl. Alternatively, each $R^6$ may be a phenyl group. Each $R^7$ is selected from an oxygen atom or a divalent hydrocarbon group. Whether $R^7$ is an oxygen atom or a divalent hydrocarbon group depends on the method used to prepare the second polyorganosiloxane of formula (II). Alternatively, each $R^7$ is an oxygen atom. Subscript b has an average value of at least 1, Subscript c has an average value of at least 1. Subscript b and subscript c may have average values such that a sum of (b+c) is sufficient to provide the second polyorganosiloxane of formula (II) with a viscosity ranging from 5 to 30,000 cSt, alternatively 10 to 200 cSt. The molar ratio of b/c may range from greater than zero to 4.5, alternatively 0.2 to 4.2, and alternatively 0.38 to 4.2. The amount of the second polyorganosiloxane of formula (II) depends on various factors including the type and amount of thermally conductive filler selected for ingredient (B) and the type and amount of the first polyorganosiloxane of formula (I), however, the amount of polyorganosiloxane of formula (II) may range from 1% to 10%, alternatively 1% to 3%, based on the combined weights of all ingredients in the grease.

The second polyorganosiloxane of formula (II) has an aryl content that is sufficient to improve stability of the grease without causing incompatibility with the polyorganosiloxanes of formula (I). For purposes of this application, 'compatible' means that when polyorganosiloxanes of formulae (I) and (II) are mixed at 25° C. for 30 seconds at 3500 rpm in a centrifugal mixer, the resulting mixture appears homogenous upon visual inspection. Without wishing to be bound by theory, it is thought that if the polyorganosiloxane of formula (II) has an aryl content that is too high, the polyorganosiloxane of formula (II) may be incompatible with the other ingredients of the grease, resulting in poor stability upon aging and/or heat exposure. Therefore, the polyorganosiloxane of formula (II) has an aryl content that is insufficient to cause incompatibility when used in a grease during the useful life of an (opto)electronic device in which the grease is used as a TIM. The polyorganosiloxane of formula (II) is typically free of groups of the formula $(OSiR^6_2)$.

The polyorganosiloxane of formula (II) may be a commercially available trimethylsiloxy-terminated poly(dimethylsiloxane/methylphenylsiloxane) copolymer, such as a 510 Fluid or a 550 Fluid from Dow Corning Corporation of Midland, Mich., USA.

The polyorganosiloxanes of formulae (I) and (II) may be prepared by known methods, such as hydrolysis and condensation of the corresponding organohalosilanes or equilibration of cyclic polydiorganosiloxanes. These methods are well known in the art. For example, polyorganosiloxanes suitable for use in ingredient (A) may be prepared by ring opening polymerization of cyclic polydiorganosiloxanes using a lithium catalyst to yield polyorganosiloxanes having silicon-bonded hydroxyl groups. Thereafter, the polyorganosiloxanes having silicon-bonded hydroxyl groups may be reacted with alkoxysilanes to prepare ingredient (A).

Alternatively, polyorganosiloxanes suitable for use as ingredient (A) may be prepared by hydrosilylation of a polyorganosiloxane having at least one silicon bonded hydrogen atom with an alkoxysilane having at least one silicon bonded aliphatically unsaturated hydrocarbon group in the presence of a platinum group metal catalyst or by hydrosilylation of a polyorganosiloxane having at least one silicon bonded aliphatically unsaturated hydrocarbon group with an alkoxysilane having at least one silicon bonded hydrogen atom in the presence of a platinum group metal catalyst. Alternatively, polyorganosiloxanes suitable for use as ingredient (A) may be prepared by methods such as those disclosed, for example, in U.S. Pat. No. 4,962,174.

The total amount of ingredient (A) depends on various factors including the polyorganosiloxanes selected for ingredient (A) and the thermally conductive filler selected for ingredient (B). However, the total amount of ingredient (A) (i.e., all the polyorganosiloxanes combined) may range from 2 vol % to 35 vol %, alternatively 10 vol % to 15 vol %, and alternatively 10 vol % to 35 vol % of total volume of all ingredients in the grease.

(B) Thermally Conductive Filler

Ingredient (B) is a thermally conductive filler. Ingredient (B) may be both thermally conductive and electrically conductive. Alternatively, ingredient (B) may be thermally conductive and electrically insulating. Ingredient (B) may be selected from the group consisting of aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof. Ingredient (B) may comprise a metallic filler, an inorganic filler, a meltable filler, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from aluminum, copper, gold, nickel, silver, and combinations thereof, and alternatively aluminum. Suitable metallic fillers are further exemplified by particles of the metals listed above having layers on their surfaces selected from aluminum nitride, aluminum oxide, copper oxide, nickel oxide, silver oxide, and combinations thereof. For example, the metallic filler may comprise aluminum particles having aluminum oxide layers on their surfaces.

Inorganic fillers are exemplified by onyx; aluminum trihydrate, metal oxides such as aluminum oxide, beryllium oxide, magnesium oxide, and zinc oxide; nitrides such as aluminum nitride and boron nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

For example, meltable fillers may be obtained from Indium Corporation of America, Utica, N.Y., U.S.A.; Arconium, Providence, R.I., U.S.A.; and AIM Solder, Cranston, R.I., U.S.A. Aluminum fillers are commercially available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A.

Thermally conductive fillers are known in the art and commercially available, see for example, U.S. Pat. No. 6,169,142 (col. 4, lines 7-33). For example, CB-A20S and Al-43-Me are aluminum oxide fillers of differing particle sizes commercially available from Showa-Denko, and AA-04, AA-2, and AA18 are aluminum oxide fillers commercially available from Sumitomo Chemical Company. Zinc oxides, such as zinc oxides having trademarks KADOX® and XX®, are commercially available from Horsehead Corporation of Monaca, Pa., U.S.A.

The shape of the thermally conductive filler particles is not specifically restricted, however, rounded particles may prevent viscosity increase to an undesirable level upon high loading of the thermally conductive filler in the composition.

Ingredient (B) may be a single thermally conductive filler or a combination of two or more thermally conductive fillers that differ in at least one property such as particle shape, average particle size, particle size distribution, and type of filler. For example, it may be desirable to use a combination of inorganic fillers, such as a first aluminum oxide having a larger average particle size and a second aluminum oxide having a smaller average particle size. Alternatively, it may be desirable, for example, use a combination of an aluminum oxide having a larger average particle size with a zinc oxide having a smaller average particle size. Alternatively, it may be desirable to use combinations of metallic fillers, such as a first aluminum having a larger average particle size and a second aluminum having a smaller average particle size. For example, the first aluminum may have an average particle size ranging from 8 micrometers to 100 micrometers, alternatively 8 micrometers to 10 micrometers. The second aluminum may have an average particle size ranging from 0.1 micrometer to 5 micrometers, alternatively 1 micrometer to 3 micrometers. Alternatively, it may be desirable to use combinations of metallic and inorganic fillers, such as a combination of metal and metal oxide fillers, e.g., a combination of aluminum and aluminum oxide fillers; a combination of aluminum and zinc oxide fillers; or a combination of aluminum, aluminum oxide, and zinc oxide fillers. Using a first filler having a larger average particle size and a second filler having a smaller average particle size than the first filler may improve packing efficiency, may reduce viscosity, and may enhance heat transfer.

The average particle size of the thermally conductive filler will depend on various factors including the type of thermally conductive filler selected for ingredient (B) and the exact amount added to the curable composition, as well as the bondline thickness of the device in which the cured product of the composition will be used when the cured product will be used as a TIM. However, the thermally conductive filler may have an average particle size ranging from 0.1 micrometer to 100 micrometers, alternatively 0.1 micrometer to 80 micrometers, alternatively 0.1 micrometer to 50 micrometers, and alternatively 0.1 micrometer to 10 micrometers.

The amount of ingredient (B) in the composition depends on various factors including type and amounts of each polyorganosiloxane selected for ingredient (A) and the thermally conductive filler selected for ingredient (B). However, the amount of ingredient (B) may range from 65 vol % to 98 vol %, alternatively 65 vol % to 90 vol %, alternatively 85 vol % to 98 vol %, alternatively 85 vol % to 95 vol % of the total volume of ingredients in the grease. Without wishing to be bound by theory, it is thought that when the amount of filler is greater than 98 vol %, the grease may lack sufficient integrity for some applications, and when the amount of filler is less than 65 vol %, the grease may have insufficient thermal conductivity for TIM applications.

Additional Ingredients

The grease may optionally further comprise an additional ingredient. Examples of suitable additional ingredients include (C) a spacer, (D) a filler treating agent, (E) an antioxidant, (F) a pigment, (G) a vehicle, (H) a wetting agent, (I) an antifoaming agent, (J) a flame retardant, (K) a rust preventive, and a combination thereof.

(C) Spacer

Additional ingredient (C) is a spacer. Spacers may comprise organic particles, inorganic particles, or a combination thereof. Spacers may be thermally conductive, electrically conductive, or both. Spacers may have a particle size ranging from 25 micrometers to 250 micrometers. Spacers may comprise monodisperse beads. The amount of spacer depends on various factors including the distribution of particles, pressure to be applied during placement, and temperature during placement. The grease may contain up to 15%, alternatively up to 5% of spacer added in addition to, or instead of, a portion of ingredient (B).

(D) Filler Treating Agent

The thermally conductive filler for ingredient (B) and/or the spacer for ingredient (C), if present, may optionally be surface treated with ingredient (D) a treating agent. Treating agents and treating methods are known in the art, see for example, U.S. Pat. No. 6,169,142 (col. 4, line 42 to col. 5, line 2).

The amount of ingredient (D) may vary depending on various factors including the type and amounts of fillers selected for ingredients (B) and (C) and whether the filler is treated with ingredient (D) in situ or before being combined with other ingredients of the grease. However, the grease may comprise an amount ranging from 0.1% to 2% of ingredient (D).

Ingredient (D) may comprise an alkoxysilane having the formula: $R^{11}_e Si(OR^{12})_{(4-e)}$, where subscript e is 1, 2, or 3; alternatively e is 3. Each $R^{11}$ is independently a monovalent organic group, such as a monovalent hydrocarbon group of 1 to 50 carbon atoms, alternatively 6 to 18 carbon atoms. $R^{11}$ is exemplified by alkyl groups such as hexyl, octyl, dodecyl, tetradecyl, hexadecyl, and octadecyl; and aromatic groups such as benzyl, phenyl and phenylethyl. $R^{11}$ can be saturated or unsaturated, branched or unbranched, and unsubstituted. $R^{11}$ can be saturated, unbranched, and unsubstituted.

Each $R^{12}$ may be an unsubstituted, saturated hydrocarbon group of 1 to 4 carbon atoms, alternatively 1 to 2 carbon atoms. Alkoxysilanes for ingredient (D) are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as treating agents. Alkoxy-functional oligosiloxanes and methods for their preparation are known in the art, see for example, EP 1 101 167 A2. For example, suitable alkoxy-functional oligosiloxanes include those of the formula $(R^{15}O)_f Si(OSiR^{13}_2 R^{14})_{(4-f)}$. In this formula, subscript f is 1, 2, or 3, alternatively f is 3. Each $R^{13}$ can be independently selected from saturated and unsaturated monovalent hydrocarbon groups of 1 to 10 carbon atoms. Each $R^{14}$ can be a saturated or unsaturated monovalent hydrocarbon group having at least 11 carbon atoms. Each $R^{15}$ can be an alkyl group.

Metal fillers can be treated with alkylthiols such as octadecyl mercaptan and others, and fatty acids such as oleic acid, stearic acid, titanates, titanate coupling agents, zirconate coupling agents, and a combination thereof.

Treating agents for alumina or passivated aluminum nitride may include alkoxysilyl functional alkylmethyl polysiloxanes (e.g., partial hydrolysis condensate of $R^{16}_g R^{17}_h Si(OR^{18})_{(4-g-h)}$ or cohydrolysis condensates or mixtures), or similar materials where the hydrolyzable group may comprise silazane, acyloxy or oximo. In all of these, a group tethered to Si, such as $R^{16}$ in the formula above, is a long chain unsaturated monovalent hydrocarbon or monovalent aromatic-functional hydrocarbon. Each $R^{17}$ is independently a monovalent hydrocarbon group, and each $R^{18}$ is independently a monovalent hydrocarbon group of 1 to 4 carbon atoms. In the formula above, subscript g is 1, 2, or 3 and subscript h is 0, 1, or 2, with the proviso that the sum g+h is 1, 2, or 3. One skilled in the art could optimize a specific treatment to aid dispersion of the filler without undue experimentation. However, one skilled in the art would recognize that ingredient (D) may be omitted, and the grease may be free of the treating agents described above as ingredient (D).

(E) Antioxidant

Additional ingredient (E) is an antioxidant. Ingredient (E) may be added to the grease in an amount ranging from 0.001% to 1%. Suitable antioxidants are known in the art and commercially available. Suitable antioxidants include phenolic antioxidants and combinations of phenolic antioxidants with stabilizers. Phenolic antioxidants include fully sterically hindered phenols and partially hindered phenols. Stabilizers include organophosphorous derivatives such as trivalent organophosphorous compound, phosphites, phosphonates, and a combination thereof; thiosynergists such as organosulfur compounds including sulfides, dialkyldithiocarbamate, dithiodipropionates, and a combination thereof; and sterically hindered amines such as tetramethyl-piperidine derivatives.

Suitable phenolic antioxidants are known in the art and include vitamin E and IRGANOX® 1010 from Ciba Specialty Chemicals, U.S.A. IRGANOX® 1010 comprises pentaerythriol tetrakis(3-(3,5-di-t-butyl-4-hydroxyphenyl)propionate).

(F) Pigment

Additional ingredient (F) is a pigment. Examples of suitable pigments include carbon black and Stan-Tone 50SP01 Green (which is commercially available from PolyOne). The amount of pigment depends on various factors including the pigment selected and tint of the color desired, however, when present the amount of pigment may range from 0.0001% to 1% based on the combined weights of all ingredients in the grease.

(G) Vehicle

Additional ingredient (G) is a vehicle such as a solvent or diluent. Ingredient (G) may be added during preparation of the grease, for example, to aid mixing and delivery. All or a portion of ingredient (G) may additionally be removed after the grease is prepared. Ingredient (G) may be an organic solvent. Alternatively, ingredient (G) may be a polydialkylsiloxane fluid (e.g., polydimethylsiloxane) having a viscosity ranging from 0.5 cSt to 10 cSt, alternatively 1 cSt to 5 cSt. Suitable polydimethylsiloxane fluids for use as the vehicle are known in the art and are commercially available under the tradenames 200 Fluids and OS Fluids from Dow Corning Corporation of Midland, Mich., USA. The amount of vehicle depends on various factors including the type and amount of polyorganosiloxanes for ingredient (A) and the filler for ingredient (B), however, the amount vehicle may range from 0.0001 wt % to 3 wt %, alternatively 0.0001 wt % to 1 wt %, based on the combined weights of all ingredients in the grease.

(H) Wetting Agent

Additional ingredient (H) is a wetting agent. Suitable wetting agents include the anionic, cationic, and nonionic surfactants known in the art to act as wetting agents. Anionic wetting agents are exemplified by TERGITOL® No. 7, cationic wetting agents are exemplified by TRITON® X-100, and nonionic wetting agents are exemplified by TERGITOL® NR27.

Method of Making the Grease

The grease described above may be made by mixing all ingredients at ambient or elevated temperature using any convenient mixing equipment, such as a centrifugal mixer (such as a mixer commercially available from Hauschild) or a Baker-Perkins mixer.

Uses for the Grease

The grease described above may be used as a thermal interface material (TIM). The grease may be interposed along a thermal path between a heat source and a heat dissipator. The grease can be interposed by applying either to the heat source (e.g., (opto)electronic component) and thereafter the heat dissipator, the grease can be interposed by applying to the heat dissipator and thereafter to the heat source, or the grease can be applied to the heat source and heat dissipator simultaneously. The grease may be interposed by any convenient means, such as wet-dispensing, screen printing, stencil printing, or solvent casting the grease.

A device comprises:
a) a heat source,
b) a grease described above, and
c) a heat dissipator;

where the grease is positioned between the heat source and the heat dissipator along a thermal path extending from a surface of the heat source to a surface of the heat dissipator.

In the methods and devices described herein, the heat source may comprise an (opto)electronic component such as a LED, a semiconductor, a transistor, an IC, or a discrete device. The heat dissipator may comprise a heat sink, a thermally conductive plate, a thermally conductive cover, a fan, a circulating coolant system, or a combination thereof.

The grease may be used in direct contact with the heat source (TIM1). For example, the grease may be applied either to the (opto)electronic component and thereafter a heat spreader, or the grease may be applied to the heat spreader and thereafter to the (opto)electronic component. Alternatively, the grease may be used in direct contact with a first heat dissipator and a second heat dissipator (TIM2). The grease may be applied either to a first heat spreader (such as a metal cover) and thereafter a second heat spreader (such as a heat sink), or the grease may be applied to a second heat spreader and thereafter to a first heat spreader.

FIG. 1 shows a cross section of an exemplary device 100 containing the grease described above The device 100 comprises an (opto)electronic component (shown as an IC chip) 103 mounted to a substrate 104 through a die attach adhesive 109 containing spacers 111. The substrate 104 has solder balls 105 attached thereto through pads 110. A first thermal interface material (TIM1) 106 is interposed between the IC chip 103 and a metal cover 107. The metal cover 107 acts as a first heat spreader. A second thermal interface material (TIM2) 102 is interposed between the metal cover 107 and a heat sink (second heat spreader) 101. Heat moves along a thermal path represented by arrows 108 when the device is operated.

EXAMPLES

These examples are intended to illustrate the invention to one skilled in the art and should not be interpreted as limiting the scope of the invention set forth in the claims. Viscosity is measured at 25° C. unless otherwise indicated. Samples of grease are prepared using the following ingredients.

Ingredient A1) was $(CH_3)_3SiO\text{---}\{(CH_3)_2SiO\}_{110}\text{---}Si(OCH_3)_3$.

Ingredient A2) had the following average formula.

$$H_2C=\underset{H}{\overset{CH_3}{C}}-\underset{CH_3}{\overset{CH_3}{Si}}-O-\left(\underset{CH_3}{\overset{CH_3}{Si}}-O\right)_{25}-\underset{O}{\overset{CH_3}{\underset{|}{Si}}}-O-CH_3.$$

Ingredient A3) was a trimethylsiloxy-terminated poly(dimethylsiloxane/methylphenylsiloxane) copolymer with a viscosity of 50 cSt. Ingredient A3) is commercially available as 510 Fluid from Dow Corning Corporation.

Ingredient A4) was trimethylsiloxy-terminated poly(dimethylsiloxane/methyldecylsiloxane) copolymer having a viscosity of 50 mPa·s.

Ingredient A5) was a polyphenylmethylsiloxane polymer having a viscosity of 500 mPa·s. Ingredient A5) is commercially available as 710 Fluid from Dow Corning Corporation.

Ingredient A6) was a poly(dimethylsiloxane/methylphenylsiloxane) copolymer with a viscosity of 125 cSt. Ingredient A6) is commercially available as 550 Fluid from Dow Corning Corporation.

Ingredient B1) was aluminum powder sold under the trade name ABW-437 from Toyal America, Inc. of Lockport, Ill., USA.

Ingredient B2) was aluminum powder sold under the name ABY-499, also from Toyal America, Inc.

Ingredient B3) was zinc oxide having average particle size 0.1 micrometer sold under the trade name KADOX® 911 by Zinc Corporation of America. The fillers were not surface treated.

Example 1

Preparation of Grease

Grease samples were prepared by mixing the ingredients described in Table 1. To make samples 1, and 2, mixing was performed under ambient conditions for 30 seconds at 3500 rpm in Hauschild centrifugal mixer (dental mixer). For samples 3 and 4, mixing was performed under ambient conditions for 30 seconds in the Hauschild centrifugal mixer, but rpm was not recorded.

TABLE 1

Grease Sample Ingredients (amounts are in parts by weight)

| Ingredient | Sample 1 | Comparative Sample 2 | Sample 3 | Comparative Sample 4 | Comparative Sample 5 | Sample 6 | Comparative Sample 7 |
|---|---|---|---|---|---|---|---|
| A1) | 1.7 | 1.7 | 2.0 | 1.7 | 1.7 | 0 | 0 |
| A2) | 1.7 | 1.7 | 1.4 | 1.7 | 1.7 | 3.4 | 3.4 |
| A3) | 2.0 | 0 | 2.0 | 0 | 0 | 0 | 0 |
| A4) | 0 | 2.0 | 0 | 2.0 | 0 | 0 | 2.0 |
| A5) | 0 | 0 | 0 | 0 | 2.0 | 0 | 0 |
| A6) | 0 | 0 | 0 | 0 | 0 | 2.0 | 0 |
| B1) | 51 | 51 | 51 | 51 | 51 | 51 | 51 |
| B2) | 26 | 26 | 26 | 26 | 26 | 26 | 26 |
| B3) | 18 | 18 | 18 | 18 | 18 | 18 | 18 |

Ingredients A1), A2) and A5) were combined in the amounts shown in Table 1 above. Visual determination showed separation, indicating that ingredient A5) was incompatible with ingredients A1) and A2). When comparative sample 5 was made, it was thicker and difficult to work with compared to sample 1, which contained ingredient A3) instead of A5). Sample 1 and comparative sample 5 show that when phenyl content of the third polyorganosiloxane is too high (e.g., subscript d has a value of 0 in formula (III)), the polyorganosiloxane is incompatible with the other polyorganosiloxanes.

Example 2

Evaluation of Viscosity

Viscosities of the grease samples prepared in example 1 were measured on an Ares rheometer with a 0.6 mm gap on 25 mm diameter probes under steady shear conditions. Average viscosity (Pa·s) was measured at different shear rates initially and again after aging. Samples 1 and 2 were aged at 110° C. for 56 days. Samples 3 and 4 were aged at 85° C. and 85% relative humidity. Sample 3 was aged for 34 days, and sample 4 was aged for 20 days, under these conditions. Sample 5 was aged by heating at 150° C. for 3 days, 8 days, and 25 days. Sample 6 was aged by heating at 150° C. for 3 days and 8 days. For each sample, viscosity was measured initially and then after aging.

TABLE 2

Results for Sample 1 and Comparative Sample 2

| Sample | 0.5 s$^{-1}$ initial | 0.5 s$^{-1}$ aged |
|---|---|---|
| 1 | 3491 | 7979 |
| 2 (comp) | 3009 | 9649 |

Sample 1 and comparative sample 2 show upon aging at 110° C., viscosity measured at a shear rate of 0.5 s$^{-1}$ increased less for the sample that contained a compatible poly(dimethylsiloxane/methylphenylsiloxane) copolymer than the sample that contained a siloxane without aryl groups.

TABLE 3

Results for Sample 3 and Comparative Sample 4

| Sample | 0.5 s$^{-1}$ initial | 0.5 s$^{-1}$ aged |
|---|---|---|
| 3 | 1043 | 1917 |
| 4 (comp) | 1173 | 2182 |

Sample 3 and comparative sample 4 showed that upon aging at 85° C. and 85% relative humidity, viscosity increased less for the sample that contained a compatible poly(dimethylsiloxane/methylphenylsiloxane) copolymer than the sample that contained a siloxane without aryl groups.

TABLE 4

Results for Sample 6 and Comparative Sample 7

| Days Aged at 150° C. | Viscosity (Pa · s) of Sample 6 0.5 s$^{-1}$ | Viscosity of Sample 7 0.5 s$^{-1}$ |
|---|---|---|
| 0 | 1476 | 4297 |
| 3 | 2022 | 6571 |
| 8 | 3004 | 11990 |
| 25 | 3527 | Not measured |

Example 3

Evaluation of Thermal Performance

The grease samples prepared in example 1 were evaluated for thermal impedance according to ASTM D5470. Thermal impedance was measured using a Hitachi guarded hot plate at 50° C. An error of +/−~0.03 was assumed. The results showed that sample 1 had a thermal impedance of 0.057 C-cm$^2$/W and Comparative Sample 2 had a thermal impedance of 0.053 C-cm$^2$/W under these test conditions.

INDUSTRIAL APPLICABILITY

The grease described above is suitable for use as a TIM in various electronic devices. The grease preferably does not react significantly, or increase significantly in viscosity, over time when used as a TIM in an electronic device. Without wishing to be bound by theory, it is thought that the combination of polyorganosiloxanes in ingredient (A) in the grease may reduce or eliminate viscosity increase with time when the grease is used as a TIM.

DRAWINGS

FIG. 1 is a schematic representation of a cross section of an electronic device including the grease of this invention.

Reference Numerals

100 device
101 heat sink
102 second interface material (TIM2)
103 integrated circuit (IC) chip
104 substrate
105 solder balls
106 first interface material (TIM1)
107 metal cover
108 thermal path represented by arrows
109 die attach adhesive
110 pads
111 spacers

The invention claimed is:

1. A thermally conductive grease comprising:
(A) a combination of polyorganosiloxanes comprising
a first polyorganosiloxane of formula (I) $R^1R^2{}_2Si—(OSiR^2{}_2)_a—R^3—Si(OR^4)_3$
where each $R^1$ is independently an alkyl group or an alkenyl group, each $R^2$ is independently an alkyl group, each $R^3$ is selected from an oxygen atom and a divalent hydrocarbon group, each $R^4$ is independently an alkyl group of 1 to 6 carbon atoms, and subscript a has an average value ranging from 5 to 200;
a second polyorganosiloxane of formula (II) $R^5{}_3Si—(OSiR^5R^6)_b(OSiR^5{}_2)_c—R^7—SiR^5{}_3$
where each $R^5$ is an alkyl group, each $R^6$ is an aryl group, each $R^7$ is selected from an oxygen atom and a divalent hydrocarbon group, subscript b has an average value of at least 1, and subscript c an average value of at least 1 and with the provisos that subscript b and subscript c have average values such that a sum of (b+c) is sufficient to provide the second polyorganosiloxane with a viscosity ranging from 5 to 30,000 cSt, the amount of polyorganosiloxane of formula (II) ranges from 1% to 10% based on the combined weights of all ingredients in the grease, and the second polyorganosiloxane is compatible with the first polyorganosiloxane; and (B) a thermally conductive filler.

2. The thermally conductive grease of claim 1, where the polyorganosiloxane of formula (I) comprises a combination of polyorganosiloxanes comprising:

a polyorganosiloxane of formula (Ia) $R^8_3Si-(OSiR^8_2)_d-R^9-Si(OR^{10})_3$
where each $R^8$ is independently an alkyl group, each $R^9$ is selected from an oxygen atom and a divalent hydrocarbon group, each $R^{10}$ is independently an alkyl group of 1 to 6 carbon atoms, and subscript d has an average value ranging from 75 to 200;

a polyorganosiloxane of formula (Ib) $R^{11}R^{12}_2Si-(OSiR^{12}_2)_e-R^{13}-Si(OR^{14})_3$
where each $R^{11}$ is an alkenyl group, each $R^{12}$ is independently an alkyl group, each $R^{13}$ is selected from an oxygen atom and a divalent hydrocarbon group, each $R^{14}$ is independently an alkyl group of 1 to 6 carbon atoms, and subscript e has an average value ranging from 5 to 50.

3. The grease of claim 1, where ingredient (B) is a combination of thermally conductive fillers comprising:
(i) a metal particulate, and
(ii) a metal oxide particulate.

4. The grease of claim 3, where the metal particulate comprises:
(a) a first metal particulate having a first average particle size, and
(b) a second metal particulate having a second average particle size, wherein the first average particle size is greater than the second average particle size.

5. The grease of claim 4, where the first metal particulate is aluminum having an average particle size ranging from 1 micrometer to 3 micrometers and the second metal particulate is aluminum having an average particle size ranging from 8 micrometers to 10 micrometers.

6. The grease of claim 1, where the thermally conductive fillers are round.

7. The grease of claim 3, where the metal oxide particulate comprises aluminum oxide, zinc oxide, or a combination thereof.

8. The grease of claim 2, where in the polyorganosiloxane of formula (Ia), each $R^8$ is a methyl group, each $R^9$ is an oxygen atom, each $R^{10}$ is a methyl group, and subscript d has an average value ranging from 100 to 150.

9. The grease of claim 2, where in the polyorganosiloxane of formula (Ib), each $R^{11}$ is a vinyl group, each $R^{12}$ is a methyl group, each $R^{13}$ is an oxygen atom, each $R^{14}$ is a methyl group, and subscript e has an average value ranging from 7 to 40.

10. The grease of claim 1, where in the second polyorganosiloxane of formula (II), each $R^5$ is a methyl group, each $R^6$ is a phenyl group, each $R^7$ is an oxygen atom, and a molar ratio b/c ranges from greater than zero to 4.5.

11. The grease of claim 1, further comprising an additional ingredient selected from (C) a spacer, (D) a filler treating agent, (E) an antioxidant, (F) a pigment, (G) a vehicle, (H) a wetting agent, (I) an antifoaming agent, (J) a flame retardant, (K) a rust preventive, and a combination thereof.

12. The grease of claim 1, where the grease comprises 2 vol % to 15 vol % of ingredient (A) and 65 vol % to 98 vol % of ingredient (B).

13. A method comprising interposing the grease of claim 1 along a thermal path between a heat source and a heat dissipator.

14. The method of claim 13, where the heat source comprises an (opto)electronic component.

15. A device comprising:
a) a heat source,
b) a grease according to claim 1, and
c) a heat dissipator;
where the grease is positioned between the heat source and the heat dissipator along a thermal path extending from a surface of the heat source to a surface of the heat dissipator.

16. The device of claim 15, where the heat source comprises an (opto)electronic component.

* * * * *